United States Patent
Arguelles

(10) Patent No.: US 9,639,444 B2
(45) Date of Patent: May 2, 2017

(54) ARCHITECTURE FOR END-TO-END TESTING OF LONG-RUNNING, MULTI-STAGE ASYNCHRONOUS DATA PROCESSING SERVICES

(71) Applicant: Amazon Technologies, Inc., Reno, NV (US)

(72) Inventor: Carlos Alejandro Arguelles, Shoreline, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/467,690

(22) Filed: Aug. 25, 2014

(65) Prior Publication Data

US 2014/0365827 A1    Dec. 11, 2014

Related U.S. Application Data

(63) Continuation of application No. 13/161,338, filed on Jun. 15, 2011, now Pat. No. 8,819,488.

(51) Int. Cl.
*G06F 11/00*  (2006.01)
*G06F 11/263* (2006.01)
(Continued)

(52) U.S. Cl.
CPC ...... *G06F 11/2635* (2013.01); *G06F 11/3495* (2013.01); *G06F 11/3688* (2013.01)

(58) Field of Classification Search
CPC ............ G06F 11/263; G06F 11/2635; G06F 11/3495; G06F 11/26; G06F 11/3692; G06F 11/3688; G06F 11/3684; G06F 11/3672; G06F 11/3664; G06F 11/3636; G06F 11/36
See application file for complete search history.

(56) References Cited

U.S. PATENT DOCUMENTS 6,381,604 B1    4/2002  Caughran et al.
7,694,181 B2    4/2010  Noller et al.
(Continued)

OTHER PUBLICATIONS

U.S. Appl. No. 13/161,338, filed Jun. 15, 2011, Carlos Arguelles.
(Continued)

*Primary Examiner* — Michael Maskulinski
(74) *Attorney, Agent, or Firm* — Robert C. Kowert; Meyertons, Hood, Kivlin, Kowert & Goetzel, P.C.

(57) ABSTRACT

One or more computers is configured to run an end-to-end test including at least a plurality of independent tests of multiple stages of an asynchronous multi-stage data processing system. One of the set of independent tests is configured to send a request for test input data from a test data repository service for a particular stage. A converted version of the test input data is obtained. A comparison of the converted version to the output of the particular stage to verify operation of the particular stage is obtained. The output of the particular stage is transmitted to the test data repository service. One or more computers is configured to provide the test data repository service. The test data repository service is configured to store in the test data storage the output of the particular stage as test input data for a next stage of the asynchronous multi-stage data processing system.

20 Claims, 11 Drawing Sheets

(51) Int. Cl.
*G06F 11/34* (2006.01)
*G06F 11/36* (2006.01)

(56) References Cited

U.S. PATENT DOCUMENTS

| | | |
|---|---|---|
| 2003/0236844 A1* | 12/2003 | Kaler .................... G06F 11/36 709/206 |
| 2004/0006447 A1 | 1/2004 | Gorin |
| 2004/0107415 A1 | 6/2004 | Melamed et al. |
| 2006/0288256 A1 | 12/2006 | Mathew et al. |
| 2007/0094543 A1 | 4/2007 | Joshi et al. |
| 2007/0277154 A1* | 11/2007 | Badwe ................ G06F 11/3688 717/124 |
| 2008/0282231 A1 | 11/2008 | R et al. |
| 2011/0302454 A1 | 12/2011 | Prophete et al. |

OTHER PUBLICATIONS

Carl J. Nagle "Test Automation Frameworks", Via the Way8ack Machine Oct. 7, 2003, pp. 1-32.
Keith Zambelich "Totally Data-Driven Automated Testing", white paper, Jul. 2, 2004 pp. 1-17.

* cited by examiner

ARCHITECTURE FOR END-TO-END TESTING OF LONG-RUNNING, MULTI-STAGE ASYNCHRONOUS DATA PROCESSING SERVICES

This application is a continuation of U.S. patent application Ser. No. 13/161,338, filed Jun. 15, 2011, now U.S. Pat. No. 8,819,488, which is hereby incorporated by reference in its entirety.

BACKGROUND

Several recent advances in the ability to manipulate increasingly complex datasets and execute increasingly complex operations with respect to those datasets have resulted from the ability to provide data-processing services using platforms that can be characterized as multi-stage asynchronous data processing services. Frequently, the stages of such multi-stage asynchronous data processing services operate independently, sometimes on separate data processing systems, and data is passed between the stages over a network. Each stage performs an operation or operations, which frequently result in a conversion of the data, such as a mathematical operation performed on the data items, a format conversion of the data, or an expansion or filtering of the data set. The independence of the different stages provides for high levels of modularity and customization.

Many multi-stage asynchronous data processing services process a specified series of operations through the stages of the service in a process-communicate-queue pattern, in which, once an item is processed through a first stage, the item is transmitted to the next stage for holding until the next stage is ready to perform processing. This ability to move data through multiple stages at the throughput pace of the respective individual stages provides flexibility for the provisioning and operation of the multi-stage asynchronous data processing service.

The advantages of multi-stage asynchronous data processing services in terms of their stage independence, modularity, and flexible operational pacing present obstacles in testing and verification when changes are made to one or more individual stages of the asynchronous multi-stage data processing system. Because the interaction of the individual stages plays a role in determining processing results, a need exists for enhanced tools that allow for longitudinal testing of the entire asynchronous multi-stage data processing system in an end-to-end manner.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Introduction to Multi-Stage Asynchronous Data Processing Services

Figure 1:
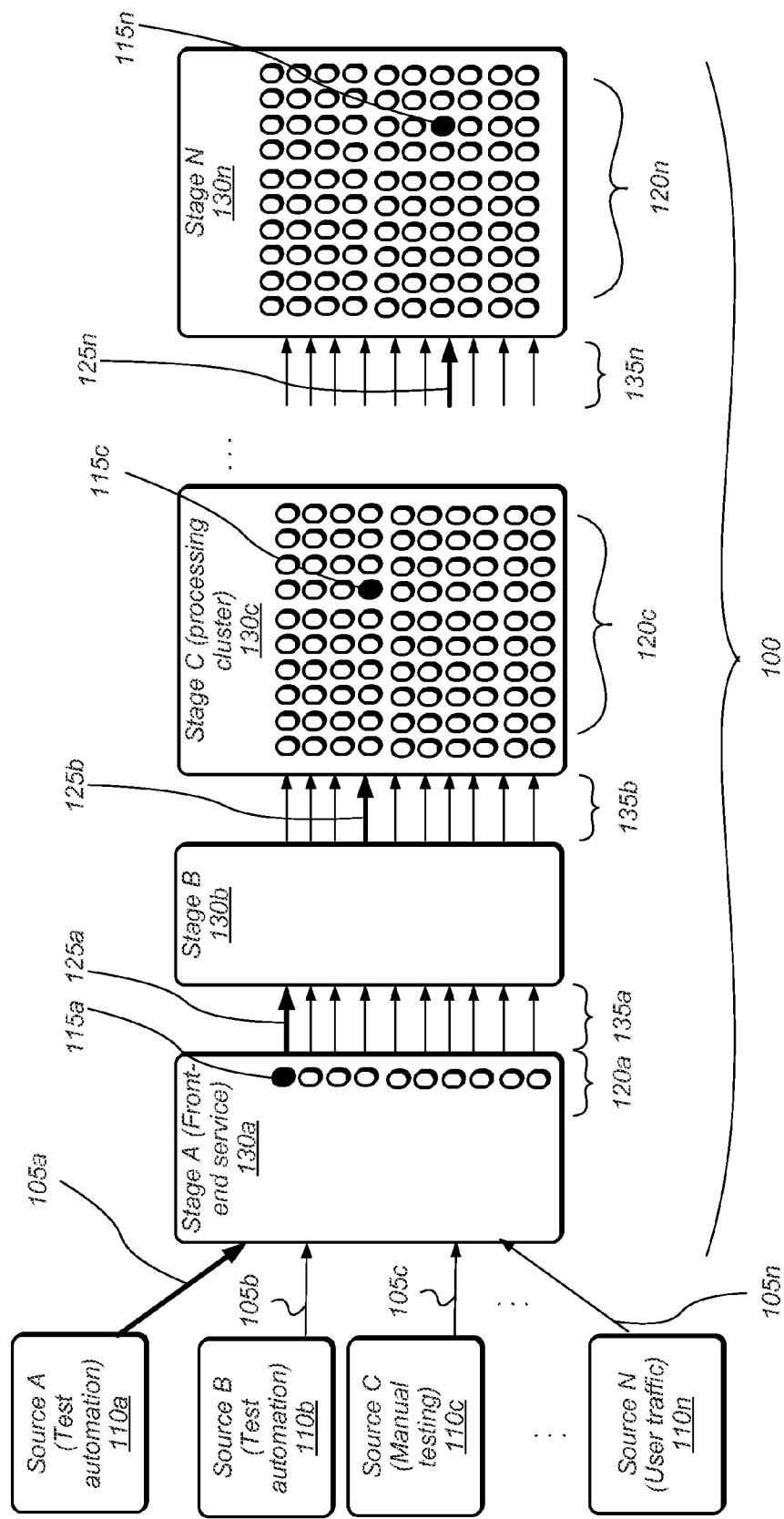
FIG. 1 is a block diagram illustrating a multi-stage asynchronous data processing system.

FIG. 1 is a block diagram illustrating a multi-stage asynchronous data processing system. A multi-stage asynchronous data processing system 100 provides data processing services with respect to data 105a-105n received from data sources 110a-110n through computing operations performed by a series of stages 130a-130n. The exact operational configurations of stages 130a-130n will vary between embodiments, such that, in some embodiments, each of stages 130a-130n may execute on a separate physical machine or virtual machine, or one or more of stages 130a-130n may execute on the same physical machines or virtual machines.

As used herein, the notation xxxa-xxxn indicates a flexibly variable quantity of a specified item, such as data 105a-105n, and the presence of differently numbered devices bearing the same reference letter (e.g., 105a and 110a), may but does not necessarily indicate a correspondence or interaction between differently numbered devices bearing the same reference letter. Further, the recurrence of 'n' as an alphabetical designator does not indicate that multiple flexibly variable quantities of devices are equal.

Nor does the designation of a single member of such a plurality as 'n' indicate that it necessarily corresponds to an '$n^{th}$' member of a different plurality, though they may correspond. Further, for simplicity in the following figures, an arrow indicating a communication between modules, processes, or functions may indicate a series of non-identical communications serving different purposes and containing different information in disparate formats.

As an example of asynchronous multi-stage data processing, data 105a is received from source A (test automation 1) 110a. Data 105a is received by stage A 130a, which is a front-end service. In one embodiment, a front-end service is a stage for capturing and storing input entering the system in the native format of the input. Examples of such a stage for capturing input entering the system in the native format of the input include monitoring systems that interact with sensors (e.g., cameras, thermal sensors, radio antennae), web servers that receive a click stream of user input across a network, security servers that process access requests, and gateway servers that receive automated processing requests from other systems. Roughly contemporaneous to the transmission of data 105a from source A (test automation 1) 110a, sources 110b-110n are also transmitting data 105b-105n, such that data 105a is captured as stored data 115a by stage A as part of a data array 120a. Examples of other potential sources 110a-110n include source B (test automation 2) 110b, source C (manual testing) 110c and source N (user traffic) 110n, each of which contributes respective items of data 105a-105n subsequently stored in data array 120a. As is illustrated by the use of both source N (user traffic) 110n and source A (test automation 1) 110a, embodiments support execution of tests on systems currently in use with live payloads. Further, as is illustrated by the use of source A (test automation 1) 110a and source B (test automation 2) 110b, embodiments support the execution of multiple simultaneous tests in parallel. One of skill in the art will readily realize in light of having read the present disclosure that embodiments will vary substantially with respect to sources contributing data to stage A without departing from the scope and intent of the present disclosure.

Stage A sends data transmissions 135a including a data transmission 125a of stored data 115a to stage B 130b, in which processing occurs. Processing performed by stage B 130b varies between embodiments and will, in some embodiments result in conversions of data 125a prior to transmission of data 125b as part of transmissions 135b for storage as data 115c in data array 120c on stage C 130c. In some embodiments, conversions performed by stage B 130b will transform the format of data from a format of data 115a (e.g., query log format in a web services example) to a format of data 115c (e.g., JavaScript Object Notation (JSON), which is a lightweight text-based open standard designed for human readable data interchange). In some embodiments, conversions performed by stage B 130b will transform the content of data from content of data 115a (e.g., a request for a web page a web services example) to a content of data 115c (an analysis of a user transaction).

Stage C 130c again transforms data 115c, possibly transforming format (e.g., to a tag-delimited format) and/or data (to suggestions of placement of ads for a user) again before transmitting data 125n as part of transmissions 135n to stage n for further storage as data 115n in data array 120n, which may again involve a conversion of format (e.g., entry into an SQL database) or content (e.g., continuing with the web services example, offering probabilities with respect to the conversion of various ads by a particular user). Further, each of stages 130a-130c may convert data in a manner that changes a dimension of the data, where changing a dimension of the data involves adding to or filtering out datapoints to increase or decrease, respectively, the number of data points being processed.

As is noted above, each of stages 130a-130c requires a processing time to perform conversions of data. As an example, data 105a may be available for transmission as data transmission 125a in as little as five minutes after receipt by stage A 130a, conversion by stage B may require 2 hours, conversion by stage C 130c may require an additional 12 hours, and conversion by stage N 130n may require an additional 2 hours. As discussed below, embodiments described herein allow for end-to-end testing of multi-stage asynchronous data processing system 100 to ensure that an expected result in the form of data 115n results from the conversions applied by stages 130a-130n to data 105 received from source A 110a. Additionally, embodiments discussed below allow for the tracking, chaining, and measurement of intermediate products of stages 130a-130n, such as data 115c.

Systems for Testing Multi-Stage Asynchronous Data Processing Services

Figure 2:
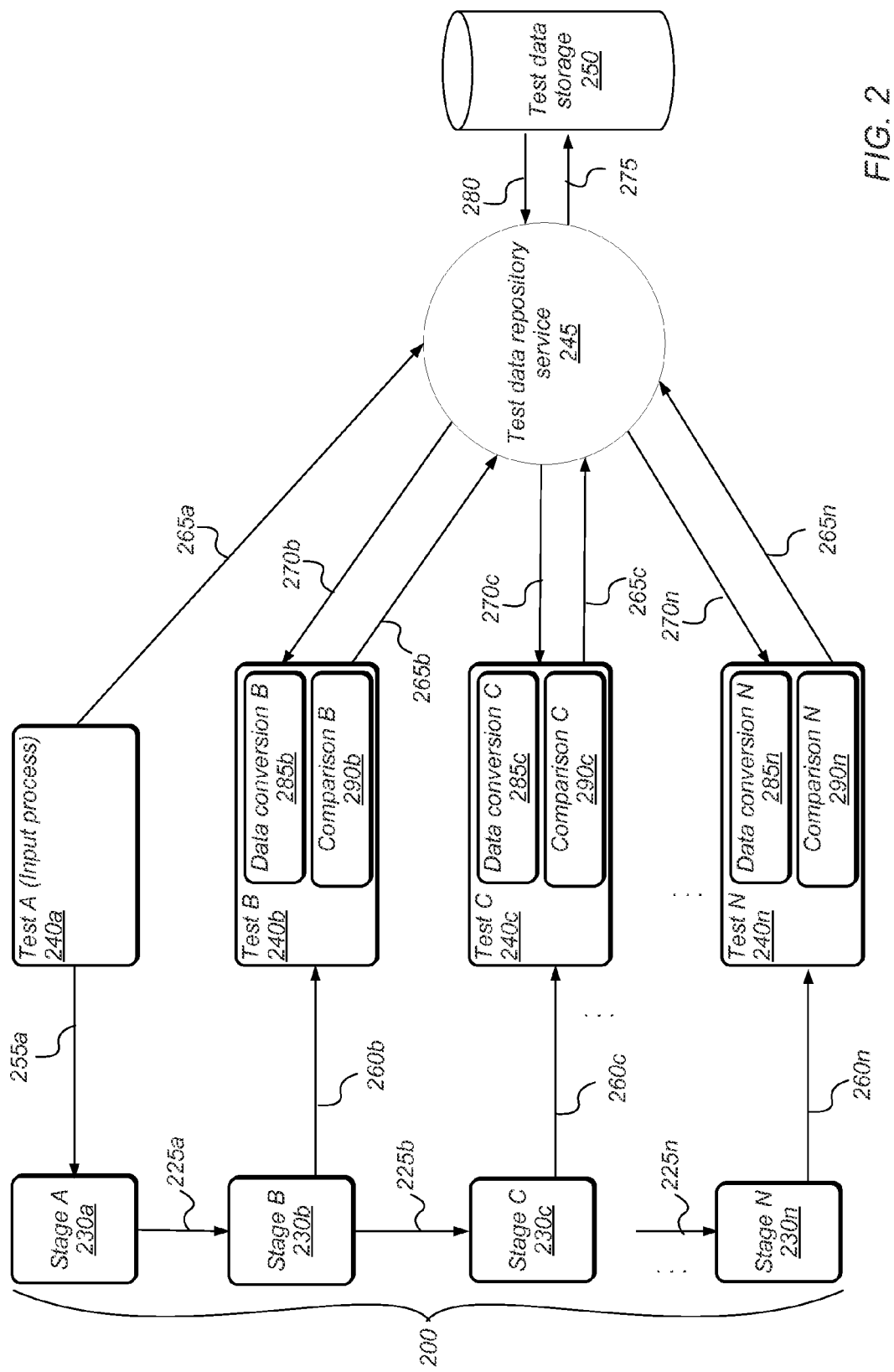
FIG. 2 is a block diagram illustrating a testing system for multi-stage asynchronous data processing services using a test data repository service, according to one embodiment.

FIG. 2 is a block diagram illustrating a testing system for multi-stage asynchronous data processing services using a test data repository service, according to one embodiment. In the illustrated example embodiment, end-to-end testing of a multi-stage asynchronous data processing system 200 composed of stages 230a-230n is performed by a set of independent tests 240a-240n running on one or more computers (not shown). An example of a suitable computer for running one or more independent tests 240a-240n is discussed below with respect to FIG. 11. Each of independent tests 240a-240n is designed to test a respective one of stages 230a-230n of multi-stage asynchronous data processing system 200.

A test data repository service 245 executes on one or more computers (not shown). An example of a suitable computer for executing test data repository service 245 is discussed, again, below with respect to FIG. 11. Test data repository service 245 communicates with independent tests 240a-240n over a network by receiving test-to-repository communications 265a-265n and sending repository-to-test communications 270b-270n. In some embodiments, test data repository service 245 is configured to support identification of test input data and output data as part of a series by associating the test input data and output data with identifying metadata.

A test data storage 250 communicates with test data repository service 245 to store and serve test data, including test input data and test output data, using service-to-storage communications 275 and storage-to-service communications 280.

In one embodiment, an end-to-end test of multi-stage asynchronous data processing system 200 begins as test A 240a sends test input data 255a (analogous to data 105a of FIG. 1) to stage A 230a. Test A 240a also sends a copy of test input data 255a to test data repository service 245 in a test-to-repository communication 265a. Stage A sends data 225a to stage B 230B.

In order to run a test of stage B 230b, test B 240b requests test input data for stage B 230b from test data repository service 245 using a test-to-repository communication 265b. Test data repository service 245 requests test input data for stage B 230b from test data storage 250 in a service-to-storage communication 275 and receives test input data for stage B 230b from test data storage 250 in a storage-to-service communication 280. Test B 240b receives a repository-to-test communication 270*b* containing test input data for stage B 230*b* (e.g., a copy of data 225*a* stored on test data storage 250 after receipt by test data repository service 245 in test-to-repository communication 265*a*).

In the embodiment shown in FIG. 2, test B 240*b* obtains a converted version of test input data for stage B 230*b* by converting test input data for stage B 230*b* using an internal conversion service (data conversion B 285*b*). The converted version of test input data for stage B 230*b* from data conversion B 285*b* is expected to match data 225*b* that is output of the stage B230*b* corresponding to test input data for stage B 230*b*.

Test B 240*b* compares the converted version of test input data for stage B 230*b* to stage B output data 260*b* received by test B 240*b*. The comparison is performed using an internal comparison function (comparison B 290*b*) to verify operation of stage B 230*b*. Test B 240*b* then stores in test data storage 250 stage B output data 260*b* by sending a test-to-repository communication 265*b* to test data repository service 245. Test data repository service 245 forwards output data 260*b* to test data storage 250 for storage by sending a service to repository communication 275 containing output data 260*b*. Independence of tests from one another, with separate requests for test input data from test data repository 245, allows a test to execute without any direct information on the status or conditions of predecessor tests. Further, use of test data repository 245 allow embodiments to isolate or render abstract actual storage details from the independent test, such that a test may request test input data from storage by sending a request to test data repository service 245 without any actual knowledge of the storage details of the test input data.

In a similar manner, in order to run a test of stage C 230*c*, test C 240*c* requests test input data for stage C 230*c* from test data repository service 245 using a test-to-repository communication 265*c*. Test data repository service 245 requests test input data for stage C 230*c* from test data storage 250 in a service-to-storage communication 275 and receives test input data for stage C 230*c* from test data storage 250 in a storage-to-service communication 280. Test C 240*c* receives a repository-to-test communication 270*c* containing test input data for stage C 230*c* (e.g., a copy of data 225*b* stored on test data storage 250 after receipt by test data repository service 245 in test-to-repository communication 265*b*).

In the embodiment shown in FIG. 2, test C 240*c* obtains a converted version of test input data for stage C 230*c* by converting test input data for stage C 230*c* using an internal conversion service (data conversion C 285*c*). The converted version of test input data for stage C 230*c* from data conversion C 285*c* is expected to match data 225*c* that is output of the stage C 230*c* corresponding to test input data for stage C 230*c*.

Test C 240*c* compares the converted version of test input data for stage C 230*c* to stage C output data 260*c* received by test C 240*c*. The comparison is performed using an internal comparison function (comparison C 290*c*) to verify operation of stage C 230*b*. Test C 240*c* then stores in test data storage 250 stage C output data 260*c* by sending a test-to-repository communication 265*c* to test data repository service 245. Test data repository service 245 forwards output data 260*c* to test data storage 250 for storage by sending a service to repository communication 275 containing output data 260*c*.

Likewise, in order to run a test of stage N 230*n*, test N 240*n* requests test input data for stage N 230*n* from test data repository service 245 using a test-to-repository communication 265*n*. Test data repository service 245 requests test input data for stage N 230*n* from test data storage 250 in a service-to-storage communication 275 and receives test input data for stage N 230*n* from test data storage 250 in a storage-to-service communication 280. Test N 240*n* receives a repository-to-test communication 270*n* containing test input data for stage N 230*n* (e.g., a copy of data 225*n* stored on test data storage 250 after receipt by test data repository service 245 in test-to-repository communication 265*c*).

In the embodiment shown in FIG. 2, test N 240*n* obtains a converted version of test input data for stage N 230*n* by converting test input data for stage N 230*n* using an internal conversion service (data conversion N 285*n*). The converted version of test input data for stage N 230*n* from data conversion N 285*n* is expected to match data 260*n* that is output of the stage C 230*c* corresponding to test input data for stage N 230*n*.

Test N 240*n* compares the converted version of test input data for stage N 230*n* to stage N output data 260*n* received by test N 240*n*. The comparison is performed using an internal comparison function (comparison N 290*n*) to verify operation of stage N 230*n*. Test N 240*n* then stores in test data storage 250 stage N output data 260*n* by sending a test-to-repository communication 265*n* to test data repository service 245. Test data repository service 245 forwards output data 260*n* to test data storage 250 for storage by sending a service to repository communication 275 containing output data 260*n*.

Figure 3:
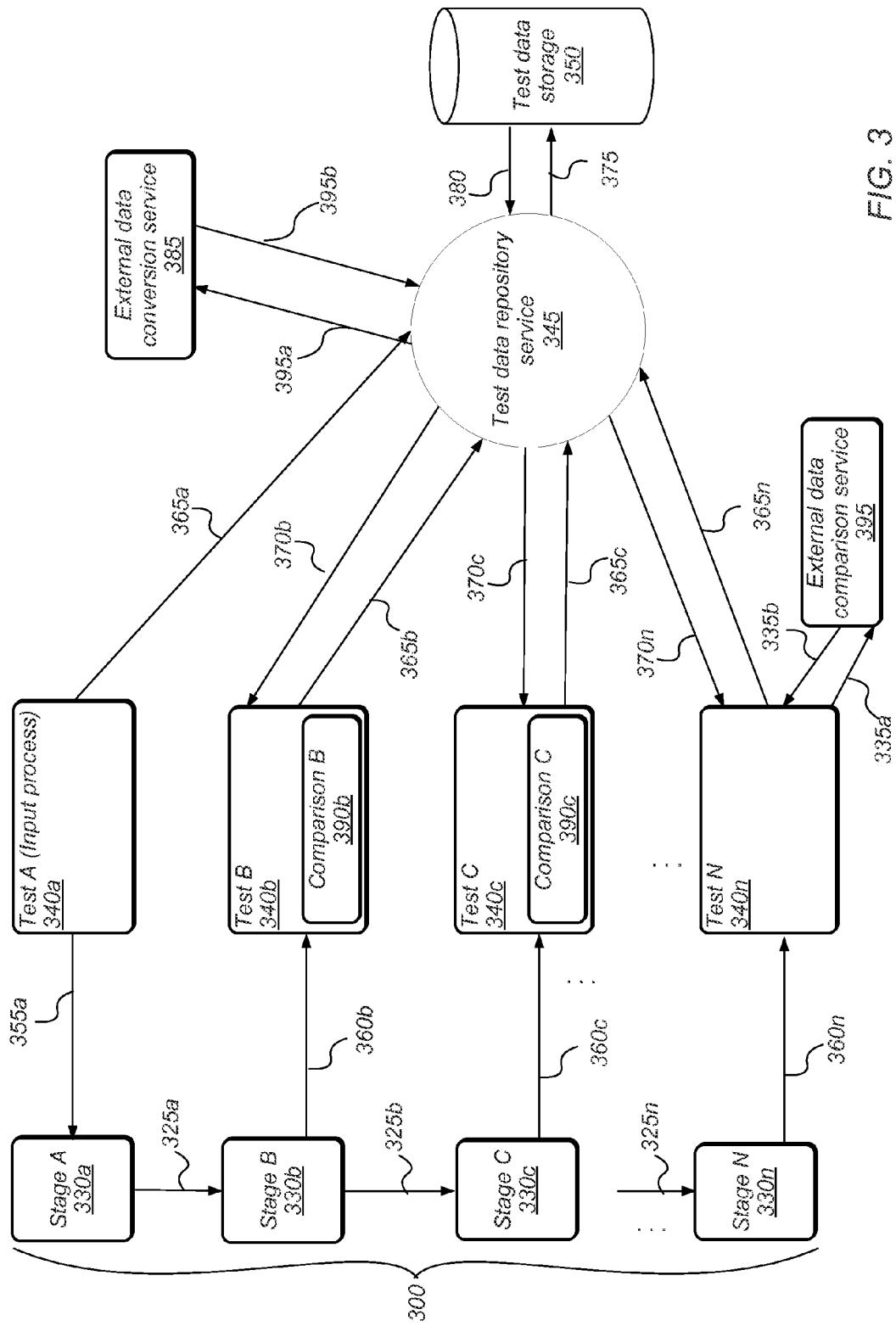
FIG. 3 is a block diagram illustrating a testing system for multi-stage asynchronous data processing services using a test data repository service, according to another embodiment.

FIG. 3 is a block diagram illustrating a testing system for multi-stage asynchronous data processing services using a test data repository service, according to another embodiment. In the illustrated example embodiment, end-to-end testing of a multi-stage asynchronous data processing system 300 composed of stages 330*a*-330*n* is performed by a set of independent tests 340*a*-340*n* running on one or more computers (not shown) using an external comparison service 395 and an external data conversion service 385. An example of a suitable computer for running one or more independent tests 340*a*-340*n* is discussed below with respect to FIG. 11. Each of independent tests 340*a*-340*n* is designed to test a respective one of stages 330*a*-330*n* of multi-stage asynchronous data processing system 300.

A test data repository service 345 executes on one or more computers (not shown). An example of a suitable computer for executing test data repository service 345 is discussed, again, below with respect to FIG. 11. Test data repository service 345 communicates with independent tests 340*a*-340*n* over a network by receiving test-to-repository communications 365*a*-365*n* and sending repository-to-test communications 370*b*-370*n*.

A test data storage 350 communicates with test data repository service 345 to store and serve test data, including test input data and test output data, using service-to-storage communications 375 and storage-to-service communications 380.

In one embodiment, an end-to-end test of multi-stage asynchronous data processing system 300 begins as test A 340*a* sends test input data 355*a* (analogous to data 105*a* of FIG. 1) to stage A 330*a*. Test A 340*a* also sends a copy of test input data 355*a* to test data repository service 345 in a test-to-repository communication 365*a*. Stage A sends data 325*a* to stage B 330B.

In some embodiments, as described below with respect to FIG. 7, tests 330*a*-330*n* subscribe to test input data from test data repository service 345 by sending a subscription message (a specialized form of repository to test communication 370) to test data repository service 345. In such a subscription model, a notification of data availability (a specialized form of test-to-repository communication 365) is sent from test data repository service 345 to test B 340b to inform test B 340b of the availability of input data for stage B 330b. In order to run a test of stage B 330b, test B 340b requests, or in some embodiments merely accepts delivery of, test input data and converted test input data for stage B 330b from test data repository service 345 using a test-to-repository communication 365b. Test data repository service 345 requests test input data for stage B 330b from test data storage 350 in a service-to-storage communication 375 and receives test input data for stage B 330b from test data storage 350 in a storage-to-service communication 380.

In the embodiment shown in FIG. 3, test data repository service 345 obtains a converted version of test input data for stage B 330b by sending to external data conversion service 385 a converted test data request 395a containing test input data for stage B 330b from test data storage 350. External data conversion service 385 converts test input data for stage B 330b. The converted version of test input data for stage B 330b from external data conversion service 385 is expected to match data 325b that is output of the stage B 330b corresponding to test input data for stage B 330b. The converted version of test input data for stage B 330b from external data conversion service 385 is returned to test data storage repository 345 in a converted test data delivery message 395b. In some embodiments, a converted version is in a format specified by the request for the test input data for the subsequent stage, and the format specified by the request for the test input data is different from a format of the test input data for the subsequent stage.

Test B 340b receives a repository-to-test communication 370b containing test input data for stage B 330b (e.g., a copy of data 325a stored on test data storage 350 after receipt by test data repository service 345 in test-to-repository communication 365a) as well as converted test data received by test data repository 345 from external data conversion service 385 in converted test data delivery message 395b.

Test B 340b compares the converted version of test input data for stage B 330b to stage B output data 360b received by test B 340b. The comparison is performed using an internal comparison function (comparison B 390b) to verify operation of stage B 330b.

Test B 340b then stores in test data storage 350 stage B output data 360b by sending a test-to-repository communication 365b to test data repository service 345. In some embodiments, metadata indicating a test series is communicated to test data repository 345 in or with output data for each stage or for selected stages. Likewise, in some embodiments, metrics indicating test performance (e.g., error logs) are communicated in or with output data to test repository 345 for each stage or for selected stages. Test data repository service 345 forwards output data 360b to test data storage 350 for storage by sending a service to repository communication 375 containing output data 360b, such forwarding may include metrics or metadata as described above for each stage or for selected stages. Thus, while the embodiment described with respect to FIG. 3 is described with forwarding of metrics and metadata only for stage B 330, one of skill in the art will realize in light of having read the present disclosure that other embodiments may be configured to employ such forwarding for multiple or all stages and their respective tests without departing from the scope of the present disclosure.

In a similar manner, in order to run a test of stage C 330c, test C 340c requests test input data for stage C 330c and converted test input data from test data repository service 345 using a test-to-repository communication 365c. In some embodiments, if subscription is being used, the request is sent in response to a notice of the availability of test input data for stage C 330c. Test data repository service 345 requests test input data for stage C 330c from test data storage 350 in a service-to-storage communication 375 and receives test input data for stage C 330c from test data storage 350 in a storage-to-service communication 380.

In the embodiment shown in FIG. 3, test data repository service 345 obtains a converted version of test input data for stage C 330c by sending to external data conversion service 385 a converted test data request 395a containing test input data for stage C 330c from test data storage 350. External data conversion service 385 converts test input data for stage C 330c. The converted version of test input data for stage C 330c from external data conversion service 385 is expected to match data 325c that is output of the stage C 330c corresponding to test input data for stage C 330c. The converted version of test input data for stage C 330c from external data conversion service 385 is returned to test data storage repository 345 in a converted test data delivery message 395b.

Test C 340c receives a repository-to-test communication 370c containing test input data for stage C 330c (e.g., a copy of data 325b stored on test data storage 350 after receipt by test data repository service 345 in test-to-repository communication 365b) as well as converted test data received by test data repository 345 from external data conversion service 385 in converted test data delivery message 395b.

Test C 340c compares the converted version of test input data for stage C 330c to stage C output data 360c received by test C 340c. The comparison is performed using an internal comparison function (comparison C 390c) to verify operation of stage C 330b. Test C 340c then stores in test data storage 350 stage C output data 360c by sending a test-to-repository communication 365c to test data repository service 345. Test data repository service 345 forwards output data 360c to test data storage 350 for storage by sending a service to repository communication 375 containing output data 360c.

Likewise, in order to run a test of stage N 330n, test N 340n requests test input data for stage N 330n and converted test input data from test data repository service 345 using a test-to-repository communication 365n. In some embodiments, if subscription is being used, the request is sent in response to a notice of the availability of test input data for stage N 330n. Test data repository service 345 requests test input data for stage N 330n from test data storage 350 in a service-to-storage communication 375 and receives test input data for stage N 330n from test data storage 350 in a storage-to-service communication 380.

In the embodiment shown in FIG. 3, test data repository service 345 obtains a converted version of test input data for stage N 330n by sending to external data conversion service 385 a converted test data request 395a containing test input data for stage N 330n from test data storage 350. External data conversion service 385 converts test input data for stage N 330n. The converted version of test input data for stage N 330n from external data conversion service 385 is expected to match data 360n that is output of the stage N 330n corresponding to test input data for stage N 330n. The converted version of test input data for stage N 330n from external data conversion service 385 is returned to test data storage repository 345 in a converted test data delivery message 395b.

Test N 340n receives a repository-to-test communication 370n containing test input data for stage N 330n (e.g., a copy of data 325n stored on test data storage 350 after receipt by test data repository service 345 in test-to-repository communication 365c) and converted test input data.

Test N 340n compares the converted version of test input data for stage N 330n to stage N output data 360n received by test N 340n. In the test embodiment shown in FIG. 3 with respect to test N 340n, the comparison is performed using an external comparison service 395 to verify operation of stage N 330n by sending a comparison request 335a containing converted input data for stage N 330n as well as actual output data 360n received from stage 330n and receiving a comparison result 335b. Test N 340n then stores in test data storage 350 stage N output data 360n by sending a test-to-repository communication 365n to test data repository service 345. Test data repository service 345 forwards output data 360n to test data storage 350 for storage by sending a service to repository communication 375 containing output data 360n.

In some embodiments, external comparison service 395 may report to test data repository service 345 metrics of verifying matches between converted input data for stage N 330n and actual output data 360n received from stage 330n using test metric data messages (not shown) to test data repository service 345. In some embodiments, metadata indicating a test series is communicated to test data repository 345 in or with such metrics.

Figure 4:
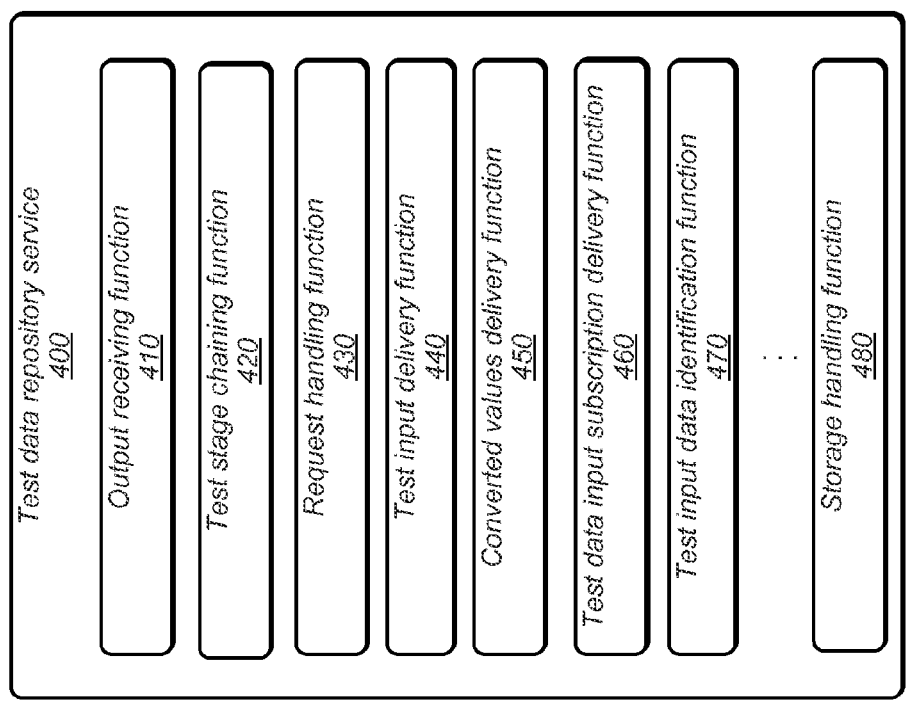
FIG. 4 is a block diagram illustrating functions of a test data repository service in a testing system for multi-stage asynchronous data processing services, according to one embodiment.

FIG. 4 is a block diagram illustrating functions of a test data repository service in a testing system for multi-stage asynchronous data processing services, according to one embodiment. Test data repository service 400 includes a series of functions executing on one or more computers. While a listing of several functions is discussed, one of skill in the art will readily realize in light of having read the present disclosure that embodiments of a test data repository service 400 will vary with respect to the functions that they provide and that many such functions, are omitted for the sake of simplicity. Thus, some embodiments will include less than all of the functions discussed below with respect to FIG. 4, and some embodiments will include functions not discussed below with respect to FIG. 4. Such differences in inclusion of functions will not depart from the scope and intent of the present disclosure. Likewise, it will be apparent to one of ordinary skill in the art in light of having read the present disclosure that discussion of function implementation details (e.g., specific application program interface behavior) is omitted for the sake of clarity and will vary between embodiments without departing from the scope and intent of the present disclosure.

An output receiving function 410 is configured for receiving from a particular test of a plurality of independent tests output of a particular stage of an asynchronous multi-stage data processing system. A test stage chaining function 420 is configured for designating the output of the particular stage of the asynchronous multi-stage data processing system as test input data for a subsequent stage of the asynchronous multi-stage data processing system. Such chaining enables end-to-end tracking of outcomes with respect to particular input data across multiple stages. In some embodiments, such chaining is supported through end-to-end unique identifiers in metadata. In other embodiments, chaining is accomplished through tracking of timestamps associated with test results. In some embodiments the completion of chaining allows for "partial testing" of a set of stages smaller than the entire service based previous runs of test data. A request handling function 430 is configured for receiving a request for test input data from a subsequent test of the plurality of independent tests to use in testing the subsequent stage A test input delivery function 440 is configured for sending to the subsequent test of the plurality of independent tests the test input data for the subsequent stage. A converted values delivery function 450 is configured for providing converted values to individual tests. In some embodiments, a converted values delivery function interacts with an external data conversion service to request and receive converted values of input data for transmission to individual tests. In other embodiments, a converted values delivery function converts values of input data for transmission to individual tests. In various embodiments, a converted values delivery function can perform one or more of conversion of data from one value to another, conversion of data between different formats, as described above, and conversions that expand or contract a dimension of data by adding data or filtering data as required.

A test data input subscription delivery function 460 is configured to handle subscription operations. In one embodiment, test data input subscription delivery function 460 is configured to receive a subscription request indicating a set of criteria describing test input data for which notifications are to be sent. Test data input subscription delivery function 460 is further configured to poll the test data repository to identify test input data on the test data repository matching the set of criteria. Additionally, in response to identifying test input data on the test data repository matching the set of criteria, test data input subscription delivery function 460 is configured to send a notification of availability of the test input data on the test data repository matching the set of criteria.

A test input data identification function 470 is configured to handle query functions. In one embodiment, test input data identification function 470 is configured to extract from the request for the test input data from the subsequent test of the plurality of independent tests a set of criteria describing requested test input data. Test input data identification function 470 is further configured survey the test data repository to identify test input data on the test data repository matching the set of criteria. In response to identifying test input data on the test data repository matching the set of criteria, test input data identification function 470 is configured to provide to the test input delivery function identifiers of the test input data on the test data repository matching the set of criteria.

A storage handling function 480 is configured for interacting with a test data storage by sending storage messages to or receiving storage messages from the test data storage.

Operations for Testing Multi-Stage Asynchronous Data Processing Services

Figure 5:
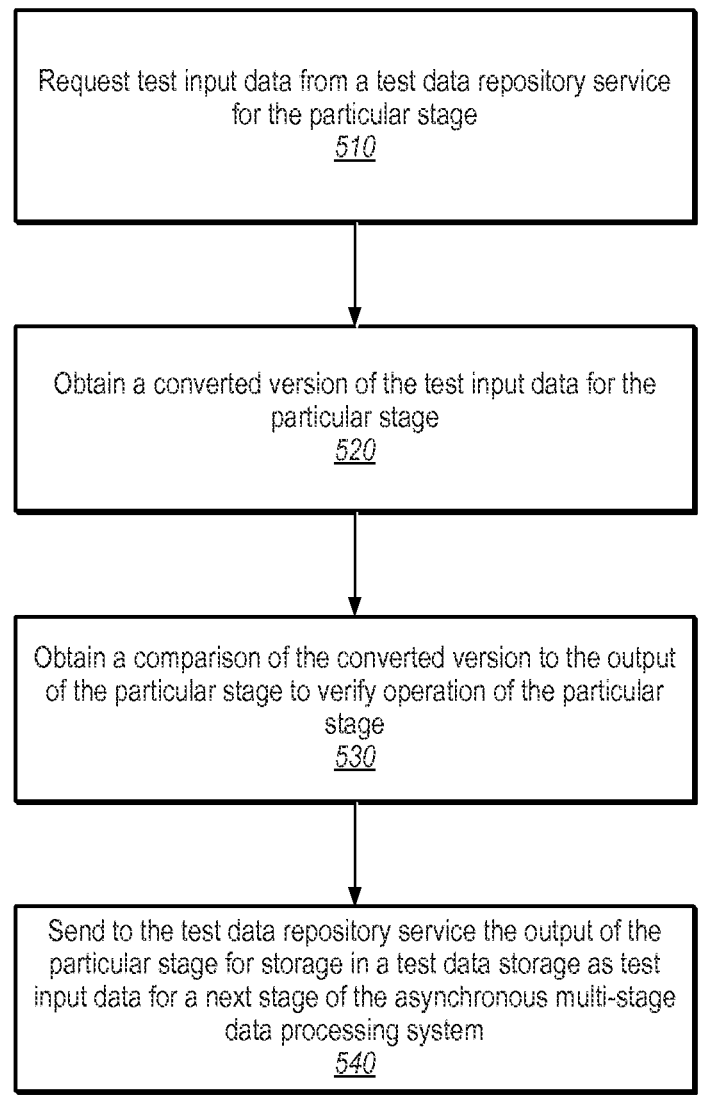
FIG. 5 is a flow diagram illustrating one embodiment of a method for operating a test interacting with a data repository service in a testing system for multi-stage asynchronous data processing services.

FIG. 5 is a flow diagram illustrating one embodiment of a method for operating a test interacting with a data repository service in a testing system for multi-stage asynchronous data processing services. Test input data from a test data repository service for the particular stage is requested (block 510). A converted version of the test input data for the particular stage is obtained (block 520). A comparison of the converted version to the output of the particular stage to verify operation of the particular stage is obtained (block 530). The output of the particular stage for storage in a test data storage as test input data for a next stage of the asynchronous multi-stage data processing system is sent to the test data repository system (block 540).

Figure 6:
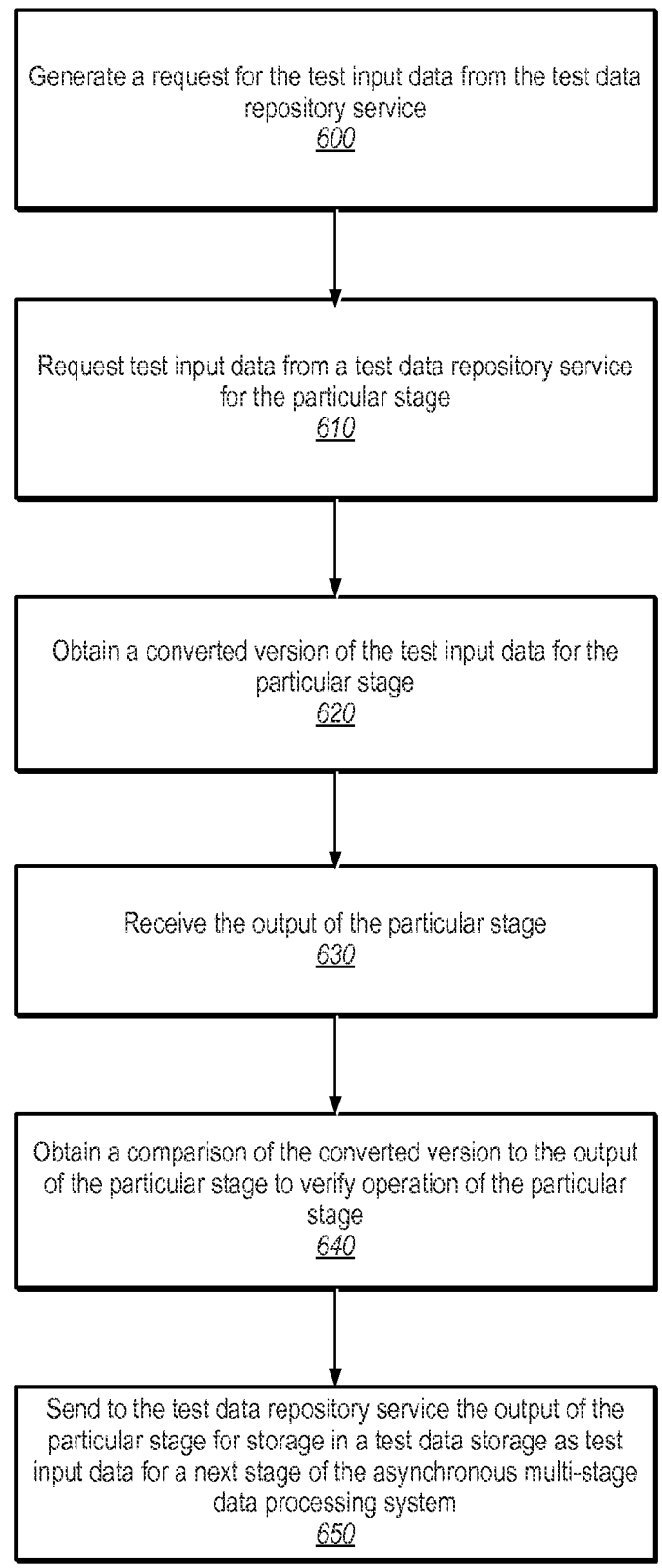
FIG. 6 is a flow diagram illustrating another embodiment of a method for operating a test interacting with a data repository service in a testing system for multi-stage asynchronous data processing services.

FIG. 6 is a flow diagram illustrating another embodiment of a method for operating a test interacting with a data repository service in a testing system for multi-stage asynchronous data processing services. A request for the test input data from the test data repository service is generated (block 600). Test input data from a test data repository service for the particular stage is requested (block 610). A converted version of the test input data for the particular stage is obtained (block 620). The output of the particular stage is received (block 630). A comparison of the converted version to the output of the particular stage to verify operation of the particular stage is obtained (block 640). The output of the particular stage for storage in a test data storage as test input data for a next stage of the asynchronous multi-stage data processing system is sent to the test data repository service (block 650).

Figure 7:
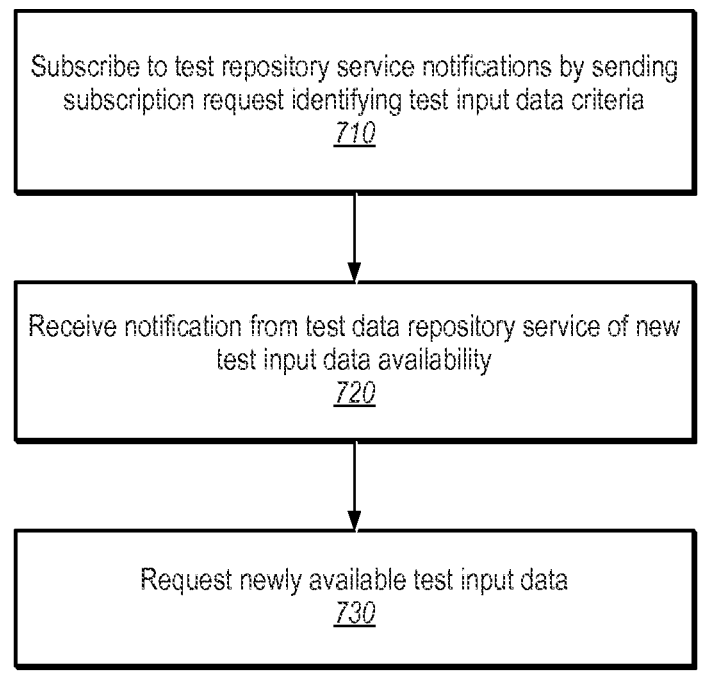
FIG. 7 is a flow diagram illustrating one embodiment of a method for interacting with a subscription service in a test data repository service of a testing system for multi-stage asynchronous data processing services.

FIG. 7 is a flow diagram illustrating one embodiment of a method for interacting with a subscription service in a test data repository service of a testing system for multi-stage asynchronous data processing services. Subscription is made to test repository service notifications by sending a subscription request identifying test input data criteria (block 710). Notification from the test data repository service of new test input data availability is received (block 720). Newly available test input data is requested (block 730).

Figure 8:
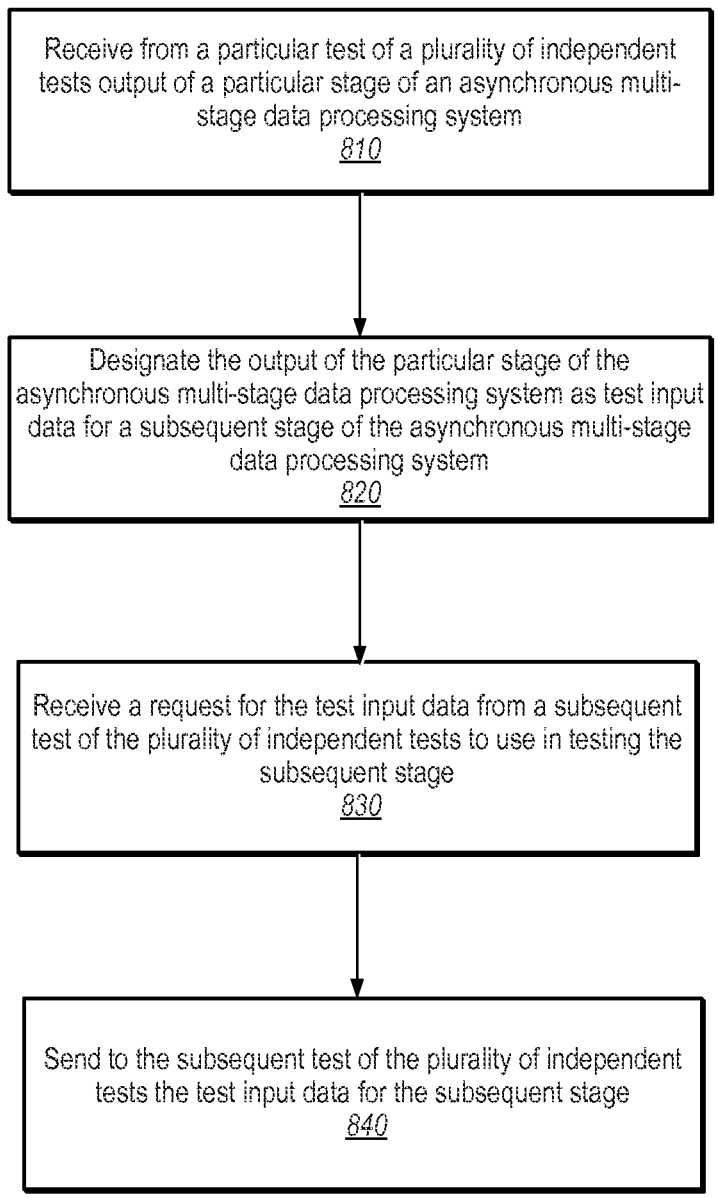
FIG. 8 is a flow diagram illustrating one embodiment of a method for operating a test data repository service in a testing system for multi-stage asynchronous data processing services.

FIG. 8 is a flow diagram illustrating one embodiment of a method for operating a test data repository service in a testing system for multi-stage asynchronous data processing services. Output of a particular stage of an asynchronous multi-stage data processing system is received from a particular test of a plurality of independent tests (block 810). The output of the particular stage of the asynchronous multi-stage data processing system is designated as test input data for a subsequent stage of the asynchronous multi-stage data processing system (block 820). A request for the test input data is received from a subsequent test of the plurality of independent tests to use in testing the subsequent stage (block 830). The test input data for the subsequent stage is sent to the subsequent test (block 840).

Figure 9:
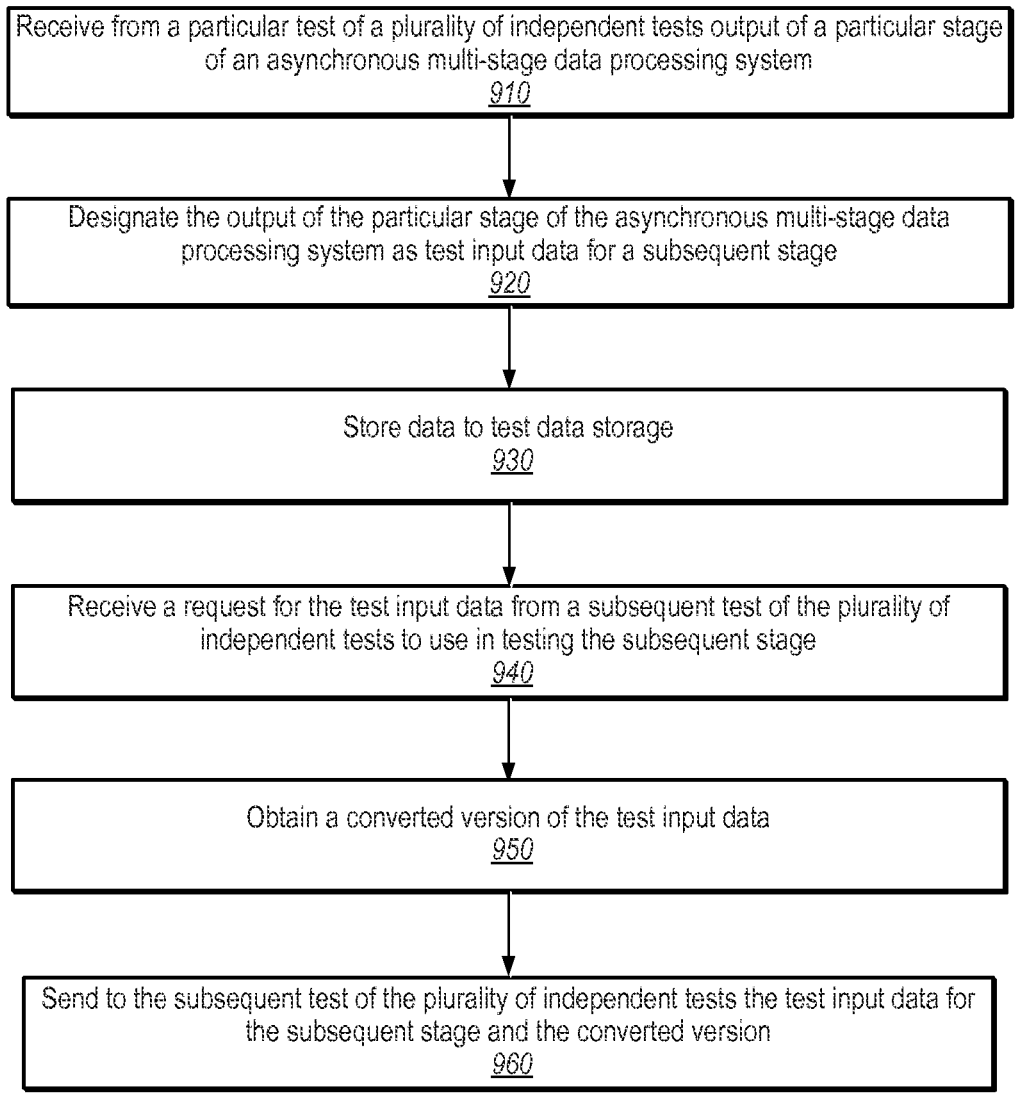
FIG. 9 is a flow diagram illustrating another embodiment of a method for operating a data repository service in a testing system for multi-stage asynchronous data processing services.

FIG. 9 is a flow diagram illustrating another embodiment of a method for operating a data repository service in a testing system for multi-stage asynchronous data processing services. Output of a particular stage of an asynchronous multi-stage data processing system is received from a particular test of a plurality of independent tests (block 910). The output of the particular stage of the asynchronous multi-stage data processing system is designated as test input data for a subsequent stage (block 920). Data is stored to test data storage (block 930). A request for the test input data is received from a subsequent test of the plurality of independent tests to use in testing the subsequent stage (block 940). A converted version of the test input data is obtained (block 950). The test input data for the subsequent stage and the converted version is sent to the subsequent test of the plurality of independent tests (block 960).

Figure 10:
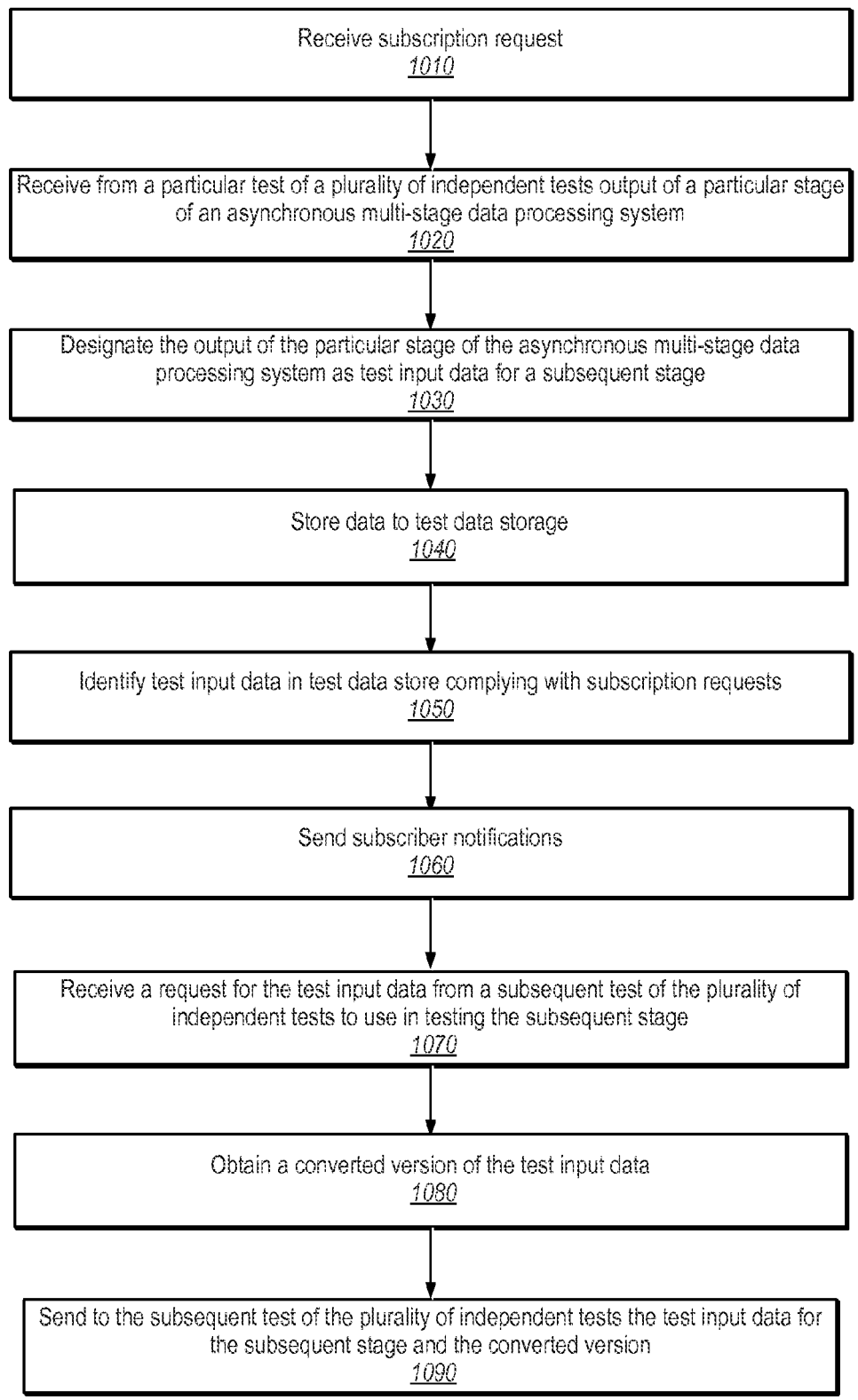
FIG. 10 is a flow diagram illustrating one embodiment of a method for operating a subscription service in a test data repository service of a testing system for multi-stage asynchronous data processing services.

FIG. 10 is a flow diagram illustrating one embodiment of a method for operating a subscription service in a test data repository service of a testing system for multi-stage asynchronous data processing services. A subscription request is received (block 1010). Output of a particular stage of an asynchronous multi-stage data processing system is received from a particular test of a plurality of independent tests (block 1020). The output of the particular stage of the asynchronous multi-stage data processing system is designated as test input data for a subsequent stage (block 1030). The data is stored to test data storage (block 1040). Test input data in test data store complying with subscription requests is identified (block 1050). Subscriber notifications are sent (block 1060). A request for the test input data is received from a subsequent test of the plurality of independent tests to use in testing the subsequent stage (block 1070). A converted version of the test input data is obtained (block 1080). The test input data for the subsequent stage and the converted version are sent to the subsequent test of the plurality of independent tests (block 1080).

Example Computing Platform for Testing Multi-Stage Asynchronous Data Processing Services The methods described herein for implementing a test repository service and using the test repository service to support testing of multi-stage asynchronous data processing services using the techniques described herein may be implemented on a wide variety of computing systems using any number of underlying system configurations and/or data storage architectures, in different embodiments. For example, in some embodiments, the test data repository service of a testing system for multi-stage asynchronous data processing services as described herein may be implemented on one or more computing nodes coupled to each other, to computing nodes hosting a web service to be exercised by one or more tests (e.g., a pre-release version of the web service) and/or to various client computing nodes through wired and/or wireless interfaces according to one or more standard communication protocols. The components making up such a system (e.g., client libraries, tests, data sets or storage for data sets, hash tables, counters, or other data structures, administrative servers, gateway processes, database servers, subscriber applications, shared computing resources, or other components configured to implement the functionality of these components as described herein), may be resident on a single computing node or may be distributed across multiple nodes, whether in a single location or at multiple sites, in different embodiments.

Figure 11:
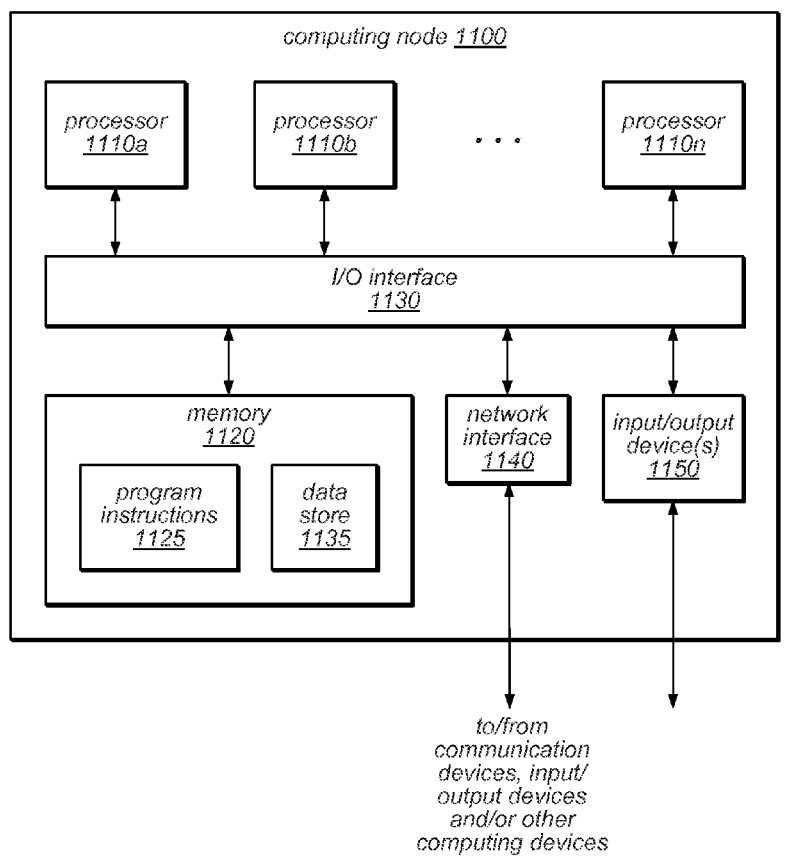
FIG. 11 is a block diagram illustrating one embodiment of a computing node suitable for implementation of a test data repository service of a testing system for multi-stage asynchronous data processing services as described herein.

One computing node that may be suitable for implementation of the test repository service to support testing of multi-stage asynchronous data processing services described herein is illustrated in FIG. 11. As noted above, computing node 1100 may include functionality to provide any or all of the components of various computing systems described herein, or multiple computing nodes similar to or different from computing node 1100 may collectively provide this functionality, in different embodiments. For example, in one embodiment, one or more computing nodes 1100 that implement client application servers (e.g., to provide access to a web service under test) may also be configured to execute the plurality of independent tests, while in other embodiments, one or more computing nodes 1100 configured to provide client application servers (e.g., to provide access to a web service under test) may also provide the test data repository service. In still other embodiments, the test data repository, web service under test, and client tests may be executed on different ones of a plurality of computing nodes 1100. In some embodiments that include multiple computing nodes 1100, all of the computing nodes 1100 may include the same or similar hardware components, software components, and functionality, while in other embodiments, the computing nodes 1100 comprising a computing system configured to implement the functionality described herein may include a wide variety of hardware components, software components, and functionality.

In the illustrated embodiment, computing node 1100 includes one or more processors 1110 coupled to a system memory 1120 via an input/output (I/O) interface 1130. Computing node 1100 further includes a network interface 1140 coupled to I/O interface 1130, and one or more input/output devices 1150. As noted above, in some embodiments, a given node may implement the functionality of more than one component of a computing system providing an independent test, web service under test, and/or test client, as described herein. In various embodiments a computing node 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA. Similarly, in a distributed computing system such as that described herein, each of the computing nodes may implement the same ISA, or individual nodes and/or replica groups of nodes may implement different ISAs.

System memory 1120 may be configured to store program instructions and/or data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 1120 as program instructions 1125 and data storage 1135, respectively. For example, program instruction 1125 may include any or all of test input data, metrics and metadata, tests, a test data repository service, administrative servers, gateway processes, database servers, subscription applications, shared computing resources, or other components configured to implement the functionality of these components as described herein. Program instructions 1125 may also include program instructions configured to implement additional functionality of a computing system not described herein.

Data storage 1135 may in various embodiments include one or more test data sets, hash tables, counters, or other data in other data structures used by the components of the test data repository, test data storage, tests, and/or web service under test. In other embodiments, program instructions and/or data as described herein for implementing a test data repository, a web service under test, and/or various tests may be received, sent or stored upon different types of computer-readable media or on similar media separate from system memory 1120 or computing node 1100, including various types of non-transitory computer-readable media. Generally speaking, a non-transitory computer-readable storage medium may include storage media or memory media such as magnetic or optical media, e.g., disk or CD/DVD-ROM coupled to computing node 1100 via I/O interface 1130. Program instructions and data stored on a computer-readable storage medium may be transmitted to a computing node 1100 for execution by a processor 1110a by transmission media or signals such as electrical, electromagnetic, or digital signals, which may be conveyed via a communication medium such as a network and/or a wireless link, such as may be implemented via network interface 1140.

In one embodiment, I/O interface 1130 may be configured to coordinate I/O traffic between processor 1110, system memory 1120, and any peripheral devices in the computing node, including network interface 1040 or other peripheral interfaces, such as input/output devices 1150. In some embodiments, I/O interface 1130 may perform any necessary protocol, timing or other data conversions to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computing node 1100 and other devices attached to a network, such as other computer systems, or between other nodes in a system providing shared computing services. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computing nodes 1100. Multiple input/output devices 1150 may be present in computing node 1100 or may be distributed on various nodes of a shared resource system or grid computing system. In some embodiments, similar input/output devices may be separate from computing node 1100 and may interact with one or more nodes of a shared resource system through a wired or wireless connection, such as over network interface 1140.

Users may interact with a computing system providing a test data repository, web service under test, and/or test client in various ways in different embodiments, such as to develop and/or store tests, to store one or more input data sets, to exercise a web service under test using various tests, and/or to receive results of test exercises. For example, some users (e.g., web service developers, test developers) may have physical access to computing node 1100, and if so, may interact with various input/output devices 1150 to provide and/or receive information. Alternatively, other users may use client computing systems to access the system, such as remotely via network interface 1140 (e.g., via the Internet and/or the World Wide Web). In addition, some or all of the computing nodes of a system providing the service may provide various feedback or other general types of information to users via one or more input/output devices 1150.

Those skilled in the art will appreciate that computing node 1100 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing node 1100 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a non-transitory computer-readable storage medium or a portable article to be read by an appropriate drive, various examples of which are described above. In some embodiments, instructions stored on a computer-readable storage medium separate from computing node 1100 may be transmitted to computing node 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-readable storage medium. Accordingly, different embodiments may be practiced with other computer system configurations.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a non-transient computer readable storage medium, any aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more testing computers configured to run an end-to-end test of an asynchronous multi-stage data processing system comprising a plurality of independent tests, wherein individual ones of the independent tests are designed to test a respective stage of the asynchronous multi-stage data processing system, wherein a particular stage of the asynchronous multi-stage data processing system is configured to perform a different operation than another stage of the asynchronous multi-stage data processing system, and wherein the asynchronous multi-stage data processing system is separate from the one or more testing computers; and
one or more computers configured to provide a test data repository service, wherein the test data repository service is configured to communicate with the one or more testing computers via a network,
wherein to test a particular stage of the asynchronous multi-stage data processing system, a corresponding particular independent test of the plurality of independent tests is configured to cause at least one of the one or more testing computers to:
request test input data for the particular stage from the test data repository service, wherein the test input data for the particular stage is data that was output from another stage of the asynchronous multi-stage data processing system,
obtain a converted version of the test input data for the particular stage,
obtain an output of the particular stage, wherein the output of the particular stage corresponds to the test input data,
compare the converted version to the output of the particular stage to verify operation of the particular stage, and
provide the output of the particular stage to the test data repository service.

2. The system as recited in claim 1, wherein the test data repository service is further configured to:
receive from a different independent test of the plurality of independent tests a request for next test input data for a next stage of the asynchronous multi-stage data processing system; and
in response to the request for the next test input data, send to the different independent test the output of the particular stage as the next test input data.

3. The system as recited in claim 1, wherein the test data repository service is further configured to:
generate the converted version of the test input data for the particular stage; and
send to the particular independent test the converted version of the test input data.

4. The system as recited in claim 1, wherein another independent test of the plurality of independent tests is configured to operate in parallel with the particular independent test of the plurality of independent tests in testing the asynchronous multi-stage data processing system.

5. The system of claim 1, wherein the test data repository service is further configured to fulfill the request for the test input data from the test data repository service for the particular stage based on metadata containing a test input data identifier that corresponds to the test input data.

6. The system of claim 1, wherein the test data repository service is further configured to fulfill the request for the test input data from the test data repository service for the particular stage based on an identity of the particular stage and based on time information.

7. The system of claim 1, further comprising a test data storage configured to communicate with the test data repository service and configured to store data corresponding to the test input data and to the output of the particular stage.

8. The system of claim 1, wherein the output of the particular stage is generated in response to the test input data for the particular stage being provided to the particular stage.

9. The system of claim 1, wherein the output of the particular stage has a same format as the converted version of the test input data.

10. A non-transitory computer-readable storage medium storing program instructions that when executed cause a server to implement a test data repository service, wherein the test data repository service comprises:
  a data receiving function for receiving, from a particular independent test of a plurality of independent tests, test output data corresponding to a particular stage of an asynchronous multi-stage data processing system, wherein the particular stage is configured to perform a different operation than another stage of the asynchronous multi-stage data processing system, and wherein the asynchronous multi-stage data processing system is separate from the test data repository service;
  a request handling function for receiving a request for test input data from a subsequent independent test of the plurality of independent tests to use in testing a corresponding subsequent stage of the asynchronous multi-stage data processing system;
  a test stage chaining function for designating the test output data corresponding to the particular stage as the test input data for the subsequent stage; and
  a test input delivery function for sending to the subsequent test of the plurality of independent tests the test input data for the subsequent stage.

11. The non-transitory computer-readable storage medium of claim 10, further comprising a converted values delivery function for sending a converted version of the test input data for the subsequent stage to the subsequent independent test, wherein
  the converted version is expected to match an output of the subsequent stage corresponding to the test input data for the subsequent stage, and
  the converted version is received from an external data conversion service.

12. The non-transitory computer-readable storage medium of claim 10, further comprising a converted values delivery function for sending a converted version of the test input data for the subsequent stage to the subsequent independent test, wherein
  the converted version is expected to match an output of the subsequent stage corresponding to the test input data for the subsequent stage, and
  a format of the converted version is different from a format of the test input data for the subsequent stage.

13. The non-transitory computer-readable storage medium of claim 10, further comprising a test input data subscription delivery function configured to:
  receive a subscription request indicating a set of criteria describing test input data for which notifications are to be sent; and
  in response to identifying test input data matching the set of criteria, send a notification of availability of the test input data matching the set of criteria.

14. The non-transitory computer-readable storage medium of claim 10, further comprising a test input data identification function configured to:
  extract, from the request for the test input data from the subsequent test, a set of criteria describing requested test input data;
  in response to identifying stored test input data matching the set of criteria, provide, to the test input delivery function, identifiers of the stored test input data matching the set of criteria.

15. The non-transitory computer-readable storage medium of claim 10, wherein the test stage chaining function supports end-to-end tracking of results corresponding to particular input data across multiple stages of the asynchronous multi-stage data processing system.

16. The non-transitory computer-readable storage medium of claim 10, further comprising a converted values delivery function for sending a converted version of the test input data for the subsequent stage to the subsequent independent test, wherein
  the converted version is expected to match an output of the subsequent stage corresponding to the test input data for the subsequent stage, and
  a data dimension of the converted version is different from a data dimension of the test input data for the subsequent stage.

17. A method for performing end-to-end testing of a multi-stage asynchronous data processing system, the method comprising:
  performing, on one or more computers, a particular test of a plurality of independent tests, to verify operation of a particular stage of the asynchronous multi-stage data processing system, wherein the one or more computers are separate from the multi-stage asynchronous data processing system, the particular test comprising:
    requesting test input data for the particular stage from a test data repository service, wherein the test input data for the particular stage is data corresponds to data that was output from another stage of the asynchronous multi-stage data processing system, wherein the particular stage is configured to perform a different operation from the other stage;
    obtaining a converted version of the test input data for the particular stage;
    obtaining an output of the particular stage, wherein the output of the particular stage corresponds to the test input data;
    obtaining a comparison of the converted version to the output of the particular stage; and
    determining whether operation of the particular stage is verified based on the comparison of the converted version to the output of the particular stage.

18. The method of claim 17, further comprising sending the output of the particular stage to the test data repository service.

19. The method of claim 17, further comprising:
  performing, on the one or more computers, another test of the plurality of independent tests comprising submitting, to a first stage of the asynchronous multi-stage data processing system, an initial test data set; and
  sending, to the test data repository service, the initial test data set and an output of the first stage as test input data for a subsequent stage of the asynchronous multi-stage data processing system.

20. The method of claim 17, further comprising assigning, to the output of the particular stage, metadata that identifies the particular stage and a testing series.

\* \* \* \* \*